United States Patent [19]

Benoit

[11] Patent Number: 4,652,253

[45] Date of Patent: Mar. 24, 1987

[54] METHOD FOR PREPARING FLAT-BOTTOM THERMOPLASTIC SACK

[75] Inventor: Gordon L. Benoit, Macedon, N.Y.

[73] Assignee: Mobil Oil Corporation, New York, N.Y.

[21] Appl. No.: 642,611

[22] Filed: Aug. 20, 1984

[51] Int. Cl.⁴ .................... B31B 27/14; B31B 1/16
[52] U.S. Cl. .................... 493/195; 493/237; 493/238; 493/239
[58] Field of Search .................. 493/195, 194, 228–233, 493/237–239

[56] References Cited

U.S. PATENT DOCUMENTS

| 3,023,679 | 3/1962 | Piazze | 493/194 |
| 3,537,360 | 11/1970 | Farnam | 493/194 X |
| 3,857,329 | 12/1974 | Lehmacher et al. | 493/237 X |
| 3,868,891 | 3/1975 | Parish | 493/194 |
| 3,915,077 | 10/1975 | Lafleur et al. | 493/194 |

FOREIGN PATENT DOCUMENTS

| 1120408 | 7/1956 | France | 493/194 |
| 8400322 | 2/1984 | PCT Int'l Appl. | 493/194 |

Primary Examiner—R. L. Spruill
Assistant Examiner—Steve Katz
Attorney, Agent, or Firm—A. J. McKillop; M. G. Gilman; J. P. O'Sullivan, Sr.

[57] ABSTRACT

Method and system for preparing a flat-bottom thermoplastic sack including forming a transverse sealed seam across the mid-section of a collapsed, gusseted tube and simultaneously or subsequently forming a preweakened transverse line closely next adjacent to the sealed seam; forming diagonal sealed seams of each 2 ply gusset fold so as to meet the ends of the transverse sealed seam and removing the four double-film triangular regions outside of the diagonal seams and separating said structures along the preweakend lines to form individual flat bottom sacks. The process also includes forming a handled version of the same sack.

2 Claims, 2 Drawing Figures

METHOD FOR PREPARING FLAT-BOTTOM THERMOPLASTIC SACK

The present invention relates to methods and systems for preparing a thermoplastic sack, and, more particularly, to methods and systems for preparing such a sack having at least a substantially flat rectangular bottom. One type of bag contemplated for preparation by a system and process of the present invention is more particularly defined in copending U.S. patent application Ser. No. 606,120, filed May 2, 1984, now U.S. Pat. No. 4,554,192, the disclosure of which is in its entirety incorporated by reference herein.

The bag structure of said patent application is of a thermoplastic film material and it comprises front and rear bag walls connected by gusseted side walls. The bag has an open mouth top portion, which is characterized by having handles located at opposite end regions thereof, said handles each being of two films as a result of being integral extensions of said front, rear and gusseted side walls. The bag has a bottom wall planarly extensible so as to form a rectangle with at least no substantial excess film outside of the bulk volumetric capacity of the bottom region of said bag. By "no substantial excess" is meant no excess over that necessary to form seam seals. An alternative manner of describing the bottom of such a bag is that said bottom is formed from integral extensions of said front, rear and side walls and the closure thereof is 4 two-film, gusset-to-wall heat seals, when said bottom is a square, and 4 two-film, gusset-to-wall heat seals and 1 two-film, front wall-to-back wall heat seals when said bottom is a rectangle. The present invention also contemplates forming the same type of bag without handles.

It is an object of the invention to present a process for the preparation of the above-defined flat bottom sack.

It is yet another object of the invention to present a process for the preparation of interconnected severable flat-bottomed grocery sacks having handles.

It is still another object of the present invention to present processes of forming flat bottomed thermoplastic film sacks not having handles.

It is yet another object of the invention to present a process for preparing flat bottomed handled sacks in bag pack form.

A further object of the present invention is to present novel systems for the preparation of such thermoplastic film flat bottom sacks.

SUMMARY OF THE INVENTION

The present invention is concerned with the method for preparing an at least substantially flat, rectangular-bottom thermoplastic flexible film sack comprising:

(a) forming a tube of thermoplastic film;

(b) collapsing said tube while simultaneously forming therein two oppositely disposed, spaced-apart, parallel gussets;

(c) forming a transverse sealed seam across the midsection of said collapsed tube between the spaced-apart gussets and simultaneously or subsequently forming a pre-weakened transverse line closely next adjacent to, at least coextensive with and parallel to said transverse sealed seam;

(d) forming in each of the four gusset folds, a diagonal sealed seam so as to meet the ends of said transverse sealed seam and form an obtuse angle therewith, the seal-pair of each gusset being superimposed when the gussets are in their lay-flat position; and (e) removing four double film triangular regions bounded by (1) said diagonal seams, (2) an extension of said pre-weakened line to the side edge of said tube and (3) the side edges of said tube.

The present invention is also concerned with the method for preparing a handled, at least substantially flat, rectangular-bottom thermoplastic flexible film sack comprising:

(a) forming a tube of a thermoplastic film;

(b) collapsing said tube while simultaneously forming therein two oppositely disposed, spaced-apart, parallel gussets;

(c) forming a transverse sealed seam across the midsection of said collapsed tube between the spaced-apart gussets and simultaneously or subsequently forming a pre-weakened transverse line closely next adjacent to, at least coextensive with and parallel to said transverse sealed seam, and simultaneously or subsequently forming a transverse sealed seam across the full width of said collapsed tube at a point closely next adjacent and parallel to said pre-weakened transverse line;

(d) forming in each of the four gusset folds a diagonal sealed seam so as to meet the ends of said mid-section transverse sealed seam and form an obtuse angle therewith, the seal-pair of each gusset being superimposed when the gussets are in their lay-flat position;

(e) separating the structure along said pre-weakened line;

(f) repeating the process with a stacking in registration of the separated structures; and (g) removing from each stacked structure the four folded triangles of film located outside of the diagonal sealed seams; and (h) simultaneously or subsequently forming a pair of handles and sack mouth opening at the opposite end of said sack bottom in each sack of said stacked structures.

For a pack of such bags, a tab member is an integral extension of the bag mouth opening and each tab member has a pre-weakened region, such as perforations therein; so that when all tabs are fastened together, individual bags may be detached from the tab structure.

DETAILED DESCRIPTION OF THE INVENTION

Figure 1:
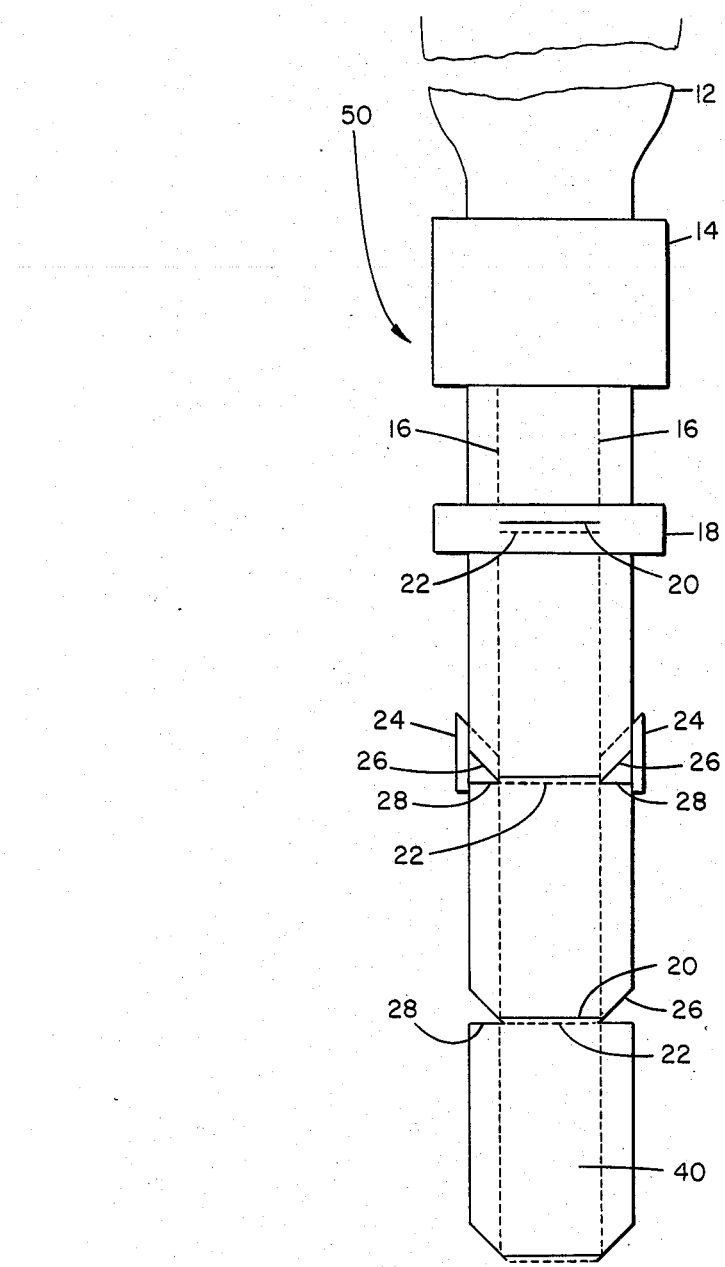
FIG. 1 is a plan view, in schematic form, illustrating a system and process sequence of one form of the present invention.

In FIG. 1, there is illustrated a system and process sequence 50 for forming a handleless, gusseted, flat-bottomed thermoplastic sack. In this process, a hollow cylinder or tube of thermoplastic film 12, formed by inflation thereof just after extrusion, is in the process of being collapsed by being passed through a collapsing and gusset-forming means 14. The tube is prepared by means well-known in the art for bubble-forming thermoplastic film. The device 14 can be of any construction which accomplishes the steps of collapsing the tube and forming oppositely disposed gussets therein. Device 14 can be a sheet-metal device which has an entrance side for receiving a flexible tube of cylindrical film. Sheet-metal plates therein cause an infolding or gusseting of any desired dimension from a fraction of an inch to several inches e.g. about 3 inches, to be fashioned in the structure as the tube passes therethrough. The exit dimension progressively diminishes to present a fully collapsed gusseted tube. Dotted lines 16 illustrates an example of the extent of infolding of the oppositely disposed gussets. The collapsed, lay-flat, gusseted tube progresses to a station 18 which thermally impresses a seal line 20 between the front and rear panels of the collapsed gusseted tube, transversely across the mid-section of said collapsed tube between the spaced-apart gussets. This thermal seal does not sever the two films. Simultaneously or subsequently a coextensive, pre-weakened transverse line 22 next closely adjacent and parallel to said transverse sealed seam 20 is effected. A convenient manner of forming a pre-weakened transverse line is by forming a line of perforations by any piercing means through the layers of film. Instead of being coextensive this preweakened line 22 can extend across the full width of the tube.

The seamed and pre-weakened gusseted tube thereafter traverses two plates 24, each of which extend into the full reach of the gusset 16. These plates can be coated with some suitable non-stick material to prevent molten thermoplastic polymer from adhering to it. Thereafter, four triangular sections are removed from the gusseted tube. The triangular sections are removed by means which will result in leaving a sealed and severed line 26 and a cut line 28 on both sides of the collapsed tube. The severance and seal line 26 is best effected by a Teflon-coated resistance wire heated to a temperature which will melt through and seal along line 26. A cutting member simultaneously or subsequently will sever each gusset fold along line 28 for a distance equal to the depth of the gusset fold. By this action, two pairs of superimposed triangular sections of film, on each side of the gusseted tube, will be removed from the tube. The triangular members are bounded by line 26, 28 and the included side edge of the tube. The four removed sections will be returned for recycling with any other scrap film. The result of this action will yield handleless bags interconnected along pre-weakened line 22 and effectively bottom sealed with lines 20 and 26. These interconnected bag structures may be rolled upon themselves to form a cylindrical package. Alternatively, they may be collected in a zig-zag folded stack arrangement. In both cases the collected interconnected bags are ready for individual severance and use. The bags also may be individually separated and folded or stacked.

In forming severance and seal line 26, it is important that seal line 26 touches or overlaps the ends of seal line 20 in order to ensure a series of bottom seal lines that do not contain gaps. It is preferred that seal line 26 touch and pass beyond the ends of seal line 20 and extend to pre-weakened line 22.

Seal and severance line 26 is a diagonal line which extends over the portion of the tube width corresponding to the gussets along lines diagonal to the length of the tube and the seal pairs of opposite sides of the collapsed tube are at an angle to one another, preferably at an angle of at least approximately 90°. The seams of each pair of seams on each side of the gusseted tube are in registration with one another. In other words, beneath seam 26, and on the other side of Teflon-coated separator plate 24, there is an identical seal line 26.

As an alternative to the process and system illustrated in FIG. 1, the four triangular sections adjacent to seals 26 can be removed subsequent to the formation of seal line 26. In this alternative preweakened line 22 is formed across the full width of the tube. Seal lines 26 are then formed so as to bond the gusset folds together but not sever them. The structures are then separated and stacked to a predetermined count, e.g. 100, so that all tops and all bottoms are in registration. Finally, the four triangular double fold sections beyond or outside of the seal lines 26 are removed by any suitable means, e.g. a cutting member. The result is a stack of handleless bags which can be gusset-expanded to yield a flat bottom.

In a preferred embodiment of the process and system illustrated in FIG. 1, a linear low-density polyethylene tubular film 12 of about 0.75-1 mil. in thickness is collapsed and simultaneously gusseted by passing through a gusset-forming means 14. This action then folds the collapsed tube to yield gussets 16. As the gusseted tube progresses through the system, seal line 20 and perforated line 22 are simultaneously formed. Thereafter, triangular regions bounded by sever and seal lines 26, severance line 28 and the outer edge of the gusset, are removed from the collapsed tube. Following this, bag blanks 40 can be convolutely wound into a roll of bags, interconnected at pre-weakened lines 22. Alternatively, the bag blanks can be separated along line 22 and stacked for packaging and for use.

Figure 2:
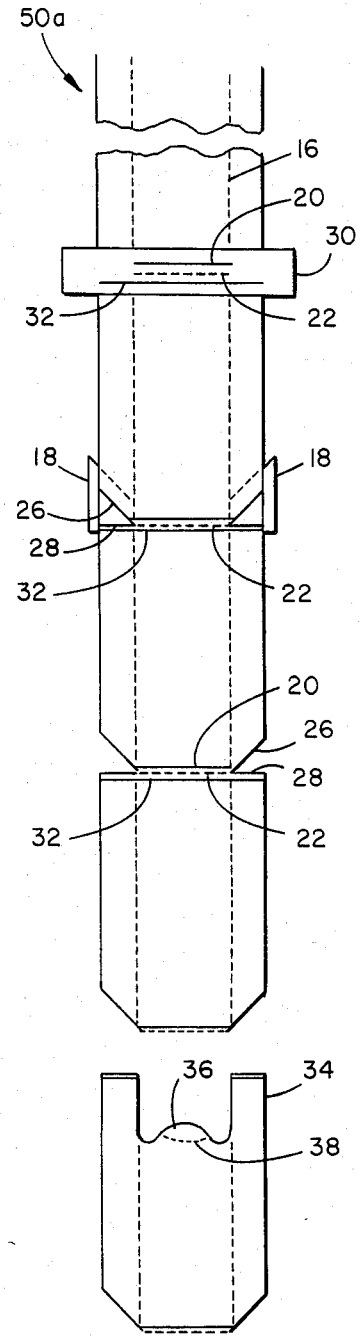
FIG. 2 is a plan view of another form of the process and system of the present invention.

As indicated in FIG. 2, 50a illustrates a system and process sequence for forming a handled, gusseted, flat-bottomed flexible thermoplastic sack and sack pack. As in FIG. 1, a tube of thermoplastic film is collapsed to a lay-flat condition so as to have gussets 16 formed therein. The gusseted tube progresses to a station 30 where seal line 20 is impressed between the front and rear panels of the collapsed tube, as in FIG. 1. Simultaneously or subsequently, a coextensive pre-weakened transverse line 22 is effected closely next adjacent to, and parallel to said transverse sealed seam 20. Again, subsequently or simultaneously to the formation of seal 20 and line 22, a seal line 32 is formed across the full width of the gusseted collapsed tube. Seal line 32 is of the same type as 20 in that it seals but does not sever the films. Ultimately, seal 32 will be the seal in the handle loops of the finished bag. Thereafter, as in FIG. 1, the gusseted portion of the tube traverses two Teflon-coated plates 18. As in FIG. 1, four sealing and severing seams are diagonally formed in the gusset region and the Teflon-coated plates prevents severed lines 26 from sticking to each other. Simultaneously or subsequently, four severing lines 28 sever the gusset folds along lines which are extensions of said pre-weakened line 22. This action removes four double thickness triangular regions from the gusset area at the bottom of the bag blank beyond or outside of seals 26. At this point, the bag bottoms are effectively sealed but still interconnected to the top of an adjacent bag blank. The bag blanks can then be severed along pre-weakened line 22, stacked to a height of 50, 75, 100, etc., and a suitable handle and bag mouth fashioned through the stacked blanks to yield a pack of bags.

As shown by 34 of FIG. 2, the bag handles and bag mouth opening can have a variety of shapes. The plurality of bags may be fastened together, for example, at a tab 36, as shown in FIG. 2. A convenient means of fastening the bags together at each tab pair, is by ultrasonic, thermal welding. Individual bags can be torn from the pack along lines such as that illustrated by pre-weakened line 38 of FIG. 2. The bag packs also can have an orifice in each tab 36 to accommodate suspension of a bag pack. This will complete the formation of a handled sack, the bottom of which can be planarly extended so as to have a flat bottom. By "planarly extended" is meant that the bag is extended in internal volume to its utmost by expanding the gussets fully, thereby forming a flat bottom, rectangular in nature, having a length greater than its width.

As an alternative to the process and system illustrated in FIG. 2, the four triangular sections adjacent to seals 26 can be removed subsequent to the formation of seals 26. In this alternative, preweakened line 22 is formed across the full width of the tube. Seal lines 26 are then formed so as to bond the gusset folds together but not sever them. The structures are then separated and stacked to a predetermined count, e.g. 100, so that all tops and all bottoms are in registration. The four triangular double fold sections beyond or outside of seal lines 26 are removed by any suitable means, e.g., a cutting member. Simultaneously or subsequently, at the opposite end of the stack, a suitable die cutting member can remove part of the stack so as to form a pair of handles, a bag mouth opening and a suitable tab member as shown at 34, 36 and 38.

In a preferred process, stacks of structures would be assembled as described immediately above with the triangular sections are still attached but with the following modification. After each structure is separated from its succeeding structure it is stacked in registration and bonded to its preceding structure. The bonding is effected with hot needles which pierce through the top structure, at least to the next structure, melt bonding each structure to the adjacent structure. The details of this technique is disclosed in copending application Ser. No. 404,175, filed Aug. 2, 1982 now U.S. Pat. No. 4,526,639. This application is incorporated herein by reference, in its entirety. The hot pin bonding is effected in an area which will ultimately be removed during handle and bag mouth forming. This hot pin bonding insures stack registration stability during stack movement as the remainder of the process is carried out. Thereafter, the stack is permanently bonded together, by any suitable means in an area which will ultimately become the suspension and tear-off region of the pack. After bonding, either simultaneously or sequentially the triangular sections are removed, as by cutting; and the handles bag mouth opening, and intermediate tab region 36 are formed by an appropriate die cutting member. During this action or subsequently, a suspension orifice is formed closely adjacent to and above the point of bonding in the tab region. At the same time or thereafter, the preweakening can be formed in the tab area above the lowest amplitude of the stress relief areas at the base of handles 34. The resulting bag pack will be similar to a stack of bags produced as in FIG. 2 but having common bonding in tab area 36, an adjacent suspension orifice and a preweakened tear-off line 38.

Bags of the structures described can be formed by employing any suitable thermoplastic material, for example, a polyolefin film. In employing the term "polyolefin", it is used generically to include all polymer species, including, for example, low-density polyethylene, linear low-density copolymers of ethylene and another alpha-olefin, high-density polyethylene, mixtures and blends of the same, and other monomer counterparts, etc. The bag film can be of any gauge, for example, from about 0.3 to about 5 mils in thickness.

In forming the flat-bottomed bag, it is preferred that the angle between the diagonal seal line and the bottom seal be at least approximately 135° when said bag is in its lay-flat condition. It is also preferred that the open-mouth portion of the handled sacks of the present invention have stress-relief curves or arcs extending from the base of the handle to a raised portion of the bag mouth. This will militate against splitting or tears occurring in the bag mouth during handle extension or when the bag is being filled with any bulky material. The handles and bag mouth opening can have any configuration.

In forming the bag structure, the pertinent angles need not be precise, e.g., exactly 90°, 45°, or 135°. Reasonable processing latitude should permit some deviation from these guidelines. Likewise, in forming seal seams, the ends thereof can be curved or angled in order to accommodate or ensure good closure at all film interfaces and joints. Double or plural line seams and seals are also contemplated.

What is claimed is:

1. The method of preparing an at least substantially flat rectangular-bottom, thermoplastic flexible film sack having double film handles comprising:
   (a) forming a tube of a thermoplastic film;
   (b) collapsing said tube while simultaneously forming therein two oppositely disposed, spaced-apart, parallel gussets;
   (c) forming a transverse sealed seam across the mid-section of said collapsed tube between the spaced-apart gussets and simultaneously or subsequently forming, across the full width of said tube, a pre-weakened transverse line closely next adjacent to, and parallel to said transverse sealed seam, and simultaneously or subsequently forming a transverse sealed seam across the full width of said collapsed tube at a point closely next adjacent to and parallel to said pre-weakened transverse line;
   (d) forming in each of the four gusset folds a diagonal sealed seam so as to meet the ends of the mid-section transverse sealed seam and form an obtuse angle therewith, the seal-pairs of each gusset being superimposed when the gussets are in their lay-flat position;
   (e) separating the structures along said pre-weakened line;
   (f) repeating the process with a stacking and registration of the separated structures; and
   (g) removing from each stacked structure four folded triangles of film located outside of the diagonal sealed seams; and
   (h) simultaneously or subsequently forming a pair of double film handles and sack mouth opening at the opposite end of said sack bottom in each sack of said stacked structures and including forming a pair of tab members as integral extensions of the bag mouth opening wherein each tab member has a pre-weakened region, so as to accomodate individual bag separation from a plurality of bag structures bonded through said tab members.

2. The method of claim 1 wherein each gusset is equal in width and the angle between projected diagonal seam lines of opposite gussets is about 90° so that said sack has an at least substantially flat bottom of unequal length and width when planarly extended.

* * * * *